United States Patent
Kawabe

(10) Patent No.: US 10,923,741 B2
(45) Date of Patent: Feb. 16, 2021

(54) FUEL CELL SEPARATOR

(71) Applicant: TOYOTA BOSHOKU KABUSHIKI KAISHA, Aichi-ken (JP)

(72) Inventor: Satoshi Kawabe, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 149 days.

(21) Appl. No.: 16/418,355

(22) Filed: May 21, 2019

(65) Prior Publication Data

US 2019/0363371 A1 Nov. 28, 2019

(30) Foreign Application Priority Data

May 28, 2018 (JP) .............................. JP2018-101259

(51) Int. Cl.
*H01M 8/026* (2016.01)
*H01M 8/0228* (2016.01)

(52) U.S. Cl.
CPC ......... *H01M 8/026* (2013.01); *H01M 8/0228* (2013.01)

(58) Field of Classification Search
CPC ................. H01M 8/0228; H01M 8/026–0267
USPC ........................................................ 429/514
See application file for complete search history.

(56) References Cited

U.S. PATENT DOCUMENTS

2012/0258383 A1* 10/2012 Utsunomiya ....... H01M 8/0228
429/509
2018/0069248 A1* 3/2018 Suzuki .................... B30B 15/02

FOREIGN PATENT DOCUMENTS

JP 6199266 4/2016

* cited by examiner

*Primary Examiner* — James M Erwin
(74) *Attorney, Agent, or Firm* — Greenblum & Bernstein, P.L.C.

(57) ABSTRACT

A fuel cell separator includes a separator body configured to be arranged between membrane electrode assemblies and includes recesses and projections formed in the separator body. The projections include first projections that are configured to face an electrode layer of the membrane electrode assembly. A thin film is arranged on a surface of each of the first projections. The recesses include first recesses that open in a protruding direction of the first projections. Each of the first recesses is configured to form a passage through which oxidizing gas or fuel gas is supplied to the electrode layer. A portion of each of the thin films that is in contact with the electrode layer of the membrane electrode assembly includes a groove, the groove connecting to at least one of the passages located on opposite sides of one of the first projections that includes the thin film.

5 Claims, 3 Drawing Sheets

FUEL CELL SEPARATOR

BACKGROUND

1. Field

The following description relates to a fuel cell separator.

2. Description of Related Art

Japanese Patent No. 6199266 discloses a fuel cell including a membrane electrode assembly (MEA) and two separators that hold the MEA in between in the thickness direction. The membrane electrode assembly includes an electrolyte film, an anode electrode layer, and a cathode electrode layer. The cathode electrode layer is joined to one of the opposite surfaces of the electrolyte film in the thickness direction. The anode electrode layer is joined to the other one of the opposite surfaces of the electrolyte film in the thickness direction. In a fuel cell, separators partition membrane electrode assemblies and sandwich the membrane electrode assemblies in the thickness direction as described above.

As schematically shown in FIG. 5, typical separators 51 each include a separator body 53, recesses 54, and projections 55. The separator body 53 is arranged between membrane electrode assemblies 52 (electrolyte film 61, anode electrode layer 57, and cathode electrode layer 58) and is conductive. The recesses 54 and the projections 55 are formed in the separator body 53 such that the recesses 54 and the projections 55 are alternately arranged in parallel to each other. The surface of each projection 55 includes a thin film 56 having a higher conductivity than the separator body 53. The projections 55 are each in contact with the anode electrode layer 57 or the cathode electrode layer 58 of the membrane electrode assembly 52 with the thin films 56 located in between.

The separator body 53 includes a passage 59 formed in the inner side of each recess 54 located between the projections 55 facing the anode electrode layer 57 of the membrane electrode assembly 52. The passage 59 is configured to supply fuel gas such as hydrogen to the anode electrode layer 57. The separator body 53 also includes a passage 60 formed in the inner side of each recess 54 located between the projections 55 facing the cathode electrode layer 58 of the membrane electrode assembly 52. The passage 60 is configured to supply oxidizing gas such as air to the cathode electrode layer 58.

In the fuel cell, when fuel gas is supplied to the anode electrode layer 57 and oxidizing gas is supplied to the cathode electrode layer 58, the fuel gas reacts with the oxidizing gas in the membrane electrode assembly 52, thereby generating power. The reaction also generates water in the cathode electrode layer 58. The water generated in such a manner is discharged out of the fuel cell by utilizing the flow of oxidizing gas in the passage 60.

The reaction of fuel gas with oxidizing gas in the membrane electrode assembly 52 is affected by electrical resistance between the membrane electrode assembly 52 and the separator body 53. In order to reduce an increase in the electrical resistance, the thin film 56 is formed on the surface of each projection 55 in the separator body 53.

In the separator 51, the projections 55 located on one side (lower side in FIG. 5) of the separator body 53 in the thickness direction are in contact with the cathode electrode layer 58 of the membrane electrode assembly 52 with the thin films 56 located in between. Thus, when the generation of power generates water in the cathode electrode layer 58, the water will be easily kept between the cathode electrode layer 58 and the thin films 56. Thus, the water generated in the cathode electrode layer 58 may not be fully discharged out of the fuel cell by the flow of oxidizing gas. This may cause the water to collect in the vicinity of the cathode electrode layer 58. The collection of water in the vicinity of the cathode electrode layer 58 limits contact of oxidizing gas with the cathode electrode layer 58. As a result, oxidizing gas is not fully diffused in the membrane electrode assembly 52, thereby deteriorating the reaction of fuel gas with oxidizing gas.

In the separator 51, the projections 55 located on the other side (upper side in FIG. 5) of the separator body 53 in the thickness direction are in contact with the anode electrode layer 57 of the membrane electrode assembly 52 with the thin films 56 located in between. When a certain amount of moisture is contained in the thin films 56 of the separator 51, the thin films 56 easily reduce an increase in the electrical resistance. Thus, when the membrane electrode assembly 52 is thinned, water generated in the cathode electrode layer 58 may travel through the electrolyte film 61 and move toward the anode electrode layer 57. In this case, when water is contained in the thin films 56 that are in contact with the anode electrode layer 57 of the membrane electrode assembly 52 in the separator 51, an increase in the electrical resistance in the thin films 56 is easily reduced. However, if the water is kept more than necessary between the thin films 56 and the anode electrode layer 57 so that the water excessively collects in the vicinity of the anode electrode layer 57, the contact of fuel gas on the anode electrode layer 57 is reduced. This may deteriorate the reaction of fuel gas with oxidizing gas in the membrane electrode assembly 52.

SUMMARY

It is an objective of the present disclosure to provide a fuel cell separator that reduces the collection of water between an electrode layer of a membrane electrode assembly and a thin film formed on the surface of a projection of a separator body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fuel cell separator includes a plate-shaped conductive separator body configured to be arranged between membrane electrode assemblies in a fuel cell and includes recesses and projections formed in the separator body such that the recesses and the projections are alternately arranged in parallel to each other. The projections include first projections that are configured to face an electrode layer of the membrane electrode assembly. A thin film is arranged on a surface of each of the first projections, the thin film having a higher conductivity than the separator body. The first projections are configured to be in contact with the electrode layer of the membrane electrode assembly with the thin films located in between. The recesses include first recesses that open in a protruding direction of the first projections, and each of the first recesses is configured to form a passage through which oxidizing gas or fuel gas is supplied to the electrode layer of the membrane electrode assembly, the passage being located on an inner side of each of the first recesses. A portion of each of the thin films that is in contact with the electrode layer of the membrane electrode assembly includes a groove, the groove extending in a direction intersecting the recesses and the projections and connecting to at least one of the passages located on opposite sides of one of the first projections that includes the thin film.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A fuel cell separator according to an embodiment will now be described with reference to FIGS. 1 to 3.

Figure 1:
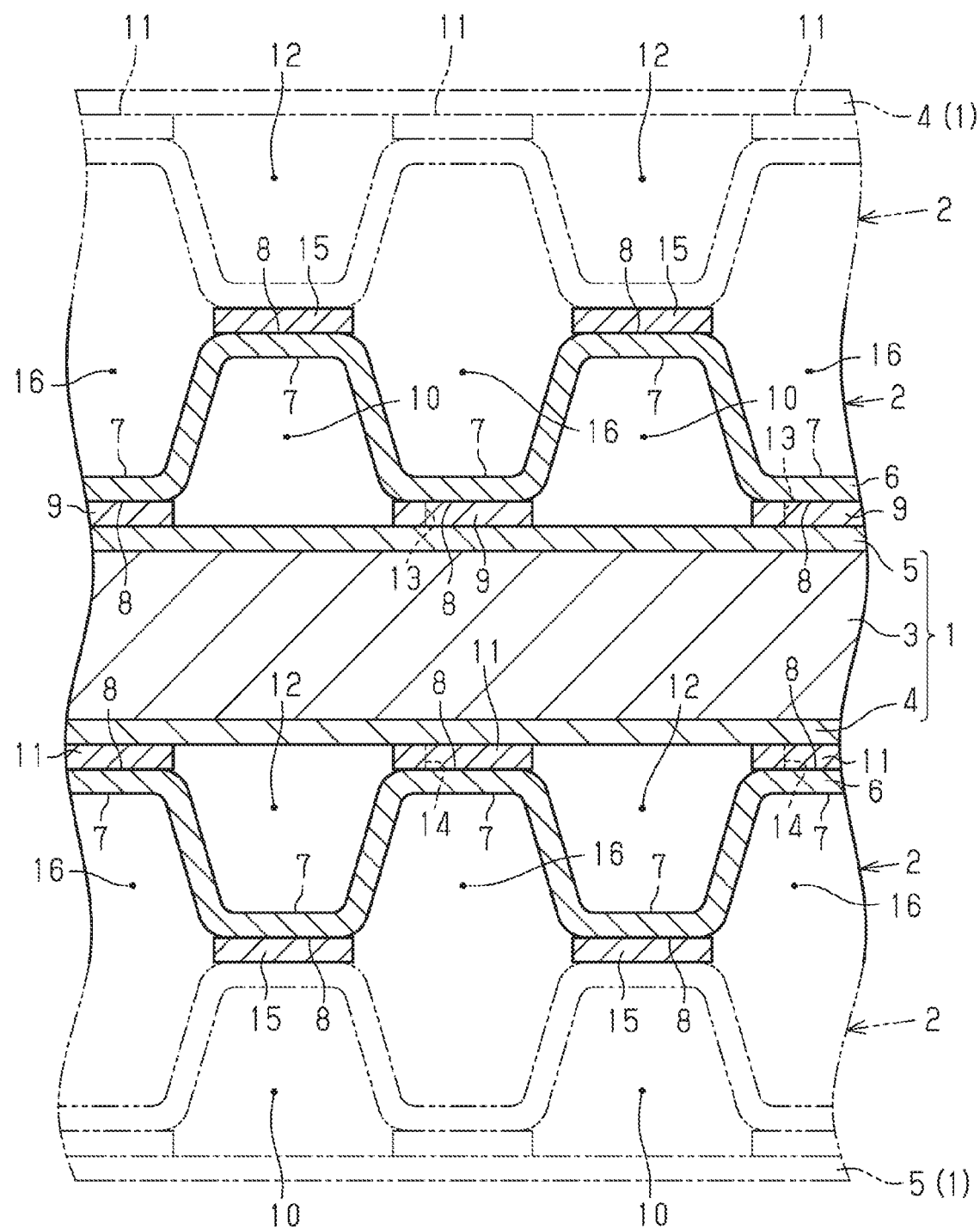
FIG. 1 is a cross-sectional view showing a fuel cell separator.

In a fuel cell shown in FIG. 1, membrane electrode assemblies 1 are each held between two separators 2 in a thickness direction (vertical direction in FIG. 1). In other words, the membrane electrode assemblies 1 in the fuel cell are partitioned from one another by the separators 2. The membrane electrode assemblies 1 of the fuel cell each include an electrolyte film 3, an anode electrode layer 4, and a cathode electrode layer 5. The cathode electrode layer 5 is joined to the upper one of the opposite surfaces of the electrolyte film 3 in the thickness direction. The anode electrode layer 4 is joined to the lower one of the opposite surfaces of the electrolyte film 3 in the thickness direction. One membrane electrode assembly 1 and two separators 2, which hold the membrane electrode assembly 1 in the thickness direction, configure one cell. The fuel cell includes a cell stack configured by laminating cells in the thickness direction.

The separator 2 includes a plate-shaped separator body 6, recesses 7, and projections 8. The separator body 6 is located between the membrane electrode assemblies 1. The recesses 7 and the projections 8 are formed in the separator body 6 such that the recesses 7 and the projections 8 are alternately arranged in parallel to each other. The separator body 6 is made of a conductive material such as titanium and stainless steel. The recesses 7 and the projections 8 are formed both on one side (lower side in FIG. 1) and the other side (upper side in FIG. 1) of the separator body 6 in the thickness direction.

As shown in FIG. 1, in the separator body 6 located on the upper side of the membrane electrode assembly 1, the projections 8 located on the one side (lower side in FIG. 1) of the separator body 6 in the thickness direction are in contact with the cathode electrode layer 5 of the membrane electrode assembly 1 with thin films 9 located in between. The thin films 9 are arranged on the surfaces of the projections 8. The thin film 9 is made of a material having a higher conductivity than that of the separator body 6 such as carbon, gold, and platinum. The thin film 9 is formed through inkjet printing to have a thickness of, for example, 10 nm to 900 µm. The thin film 9 has a higher hydrophilicity than the separator body 6. Passages 10 are formed in the inner sides of the recesses 7 of the separator body 6 that open in the protruding direction (lower side in FIG. 1) of the projections 8 having the thin films 9 on the surfaces of the projections 8. Oxidizing gas (for example, air) is supplied through the passages 10 to the cathode electrode layer 5 of the membrane electrode assembly 1. That is, when the ones of the projections 8 of the separator body 6 that face the cathode electrode layer 5 of the membrane electrode assembly 1 are referred to as first projections, the thin film 9 is arranged on the surface of each of the first projections. The first projections are in contact with the cathode electrode layer 5 of the membrane electrode assembly 1 with the thin films 9 located in between. Further, when the ones of the recesses 7 of the separator body 6 that open in the protruding direction of the first projections are referred to as first recesses, the passages 10 through which oxidizing gas (for example, air) is supplied to the cathode electrode layer 5 of the membrane electrode assembly 1 are formed in the inner sides of the first recesses.

In FIG. 1, the cell configured by the membrane electrode assembly 1 shown by the solid line and the two separators 2 shown by the solid lines sandwiching the membrane electrode assembly 1 in the thickness direction is referred to as a first cell. As shown in FIG. 1, on the upper side of the upper separator body 6 of the membrane electrode assembly 1 in the first cell, the separator body 6 of a second cell, which is located on the upper side of the first cell, is located. The projections 8 facing each other in the separator bodies 6 are in contact with each other by intervening layers 15. That is, when the ones of the projections 8 of the separator body 6 that face another separator body 6 are referred to as second projections, the second projections facing each other in the separator bodies 6 are in contact with each other by the intervening layers 15. The projections 8 (second projections) facing each other in this manner are arranged in parallel to each other in the sideward direction in FIG. 1. Passages 16 are formed by the openings of the recesses 7 on the opposite sides of the facing projections 8 in the sideward direction. Cooling liquid (for example, coolant) flows through the passages 16. That is, when the ones of the recesses 7 of the separator body 6 that open in the protruding direction of the second projections are referred to as second recesses, the passages 16 through which cooling liquid (for example, coolant) flows are formed by the openings of the second recesses of the separator bodies 6.

As shown in FIG. 1, in the separator body 6 located on the lower side of the membrane electrode assembly 1, the projections 8 located on the upper side of the separator body 6 in the thickness direction are in contact with the anode electrode layer 4 of the membrane electrode assembly 1 with thin films 11 located in between. The thin films 11 are arranged on the surfaces of the projections 8. The thin film 11 is made of a material having a higher conductivity than that of the separator body 6 such as carbon, gold, and platinum. The thin film 11 is formed through inkjet printing to have a thickness of, for example, 10 nm to 900 μm. The thin film 11 has a higher hydrophilicity than the separator body 6. Passages 12 are formed in the inner sides of the recesses 7 of the separator body 6 that open in the protruding direction (upper side in FIG. 1) of the projections 8 having the thin films 11 on the surfaces of the projections 8. Fuel gas (for example, hydrogen) is supplied through the passages 12 to the anode electrode layer 4 of the membrane electrode assembly 1. That is, when the ones of the projections 8 of the separator body 6 that face the anode electrode layer 4 of the membrane electrode assembly 1 are referred to as first projections, the thin film 11 is arranged on the surface of each of the first projections. The first projections are in contact with the anode electrode layer 4 of the membrane electrode assembly 1 with the thin films 11 located in between. Further, when the ones of the recesses 7 of the separator body 6 that open in the protruding direction of the first projections are referred to as first recesses, the passages 12 through which fuel gas (for example, hydrogen) is supplied to the anode electrode layer 4 of the membrane electrode assembly 1 are formed in the inner sides of the first recesses.

As described above, in FIG. 1, the cell configured by the membrane electrode assembly 1 shown by the solid line and the two separators 2 shown by the solid lines sandwiching the membrane electrode assembly 1 in the thickness direction is referred to as the first cell. As shown in FIG. 1, on the lower side of the lower separator body 6 of the membrane electrode assembly 1 in the first cell, the separator body 6 of a third cell, which is located on the lower side of the first cell, is located. The projections 8 (second projections) facing each other in the separator body 6 are in contact with each other by the intervening layers 15. The projections 8 (second projections) facing each other in this manner are arranged in parallel to each other in the sideward direction in FIG. 1. Passages 16 are formed by the openings of the recesses 7 (second recesses) on the opposite sides of the facing projections 8 (second projections) in the sideward direction. Coolant (cooling liquid) flows through the passages 16.

In the fuel cell, hydrogen (fuel gas) is supplied to the anode electrode layer 4 of the membrane electrode assembly 1 through the passages 12, and air (oxidizing gas) is supplied to the cathode electrode layer 5 of the membrane electrode assembly 1 through the passages 10. The hydrogen reacts with the air in the membrane electrode assembly 1, thereby generating power. The reaction also generates water in the cathode electrode layer 5.

More specifically, when hydrogen is supplied to the anode electrode layer 4 of the membrane electrode assembly 1, an electron is taken out of a hydrogen atom and delivered to the anode electrode layer 4. Then, the electron flows through the conductor of an external circuit (not shown) from the anode electrode layer 4 to the cathode electrode layer 5. When the electron is taken in the anode electrode layer 4, a hydrogen ion (proton) is positively charged. This ion passes through the electrolyte film 3 of the membrane electrode assembly 1 to move to the cathode electrode layer 5. In the cathode electrode layer 5 of the membrane electrode assembly 1 where air is supplied, the electron flowing as described above is received by an oxygen molecule to become an oxygen ion. Further, the hydrogen ion that has passed through the electrolyte film 3 from the anode electrode layer 4 to move to the cathode electrode layer 5 is bonded to the oxygen ion, thereby generating water in the cathode electrode layer 5. The water generated in this manner is discharged out of the fuel cell by the flow of air in the passage 10.

The thin film (thin film 9 or thin film 11) is arranged on the surface of each of the projections 8 (first projections) of the separator body 6 configured to face the electrode layer (anode electrode layer 4 or cathode electrode layer 5). This is because the thin film (thin film 9 or thin film 11) reduces an increase in electrical resistance between the membrane electrode assembly 1 and the separator body 6 so that the increase in the electrical resistance does not prevent the reaction of hydrogen with air in the membrane electrode assembly 1.

The thin films 9 and 11 will now be described in detail.

Figure 2:
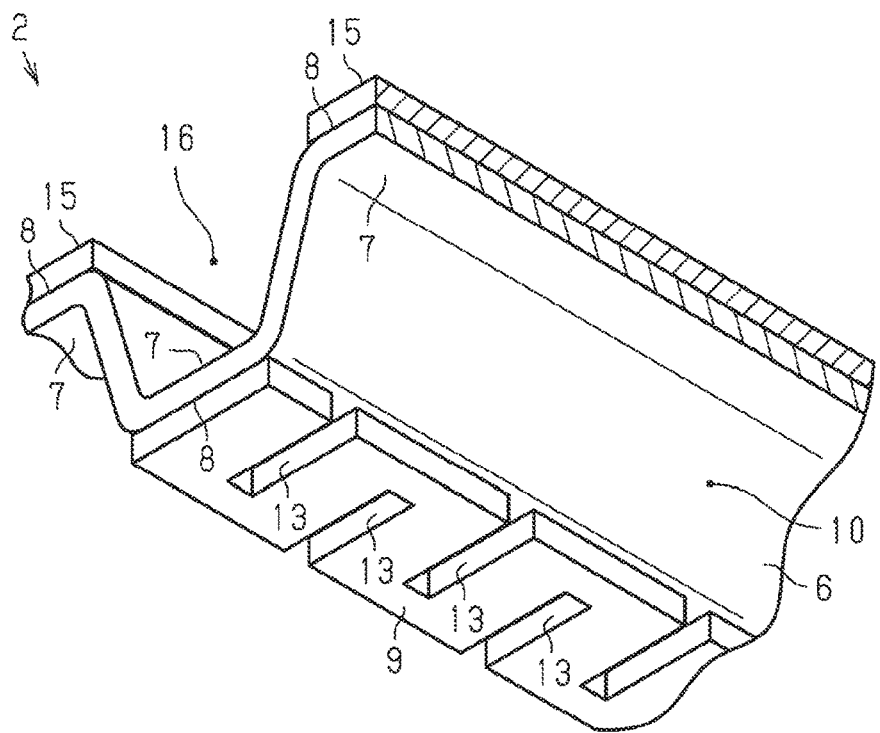
FIG. 2 is a perspective view showing the separator from a portion in contact with a cathode electrode layer.

As shown in FIG. 2, the portion (lower surface in FIG. 2) of the thin film 9 that is in contact with the cathode electrode layer 5 of the membrane electrode assembly 1 includes grooves 13. The grooves 13 extend in a direction intersecting the recesses 7 and the projections 8 to connect to the passage 10. The grooves 13 are spaced apart from one another in the direction in which the projections 8 extend. One end of each groove 13 in the longitudinal direction connects to the passage 10. More specifically, the grooves 13 that are adjacent to each other in the direction in which the projections 8 extend connect to different ones of the passages 10 located on the opposite sides of the corresponding projection 8 (first projection). That is, one of the adjacent grooves 13 in the direction in which the projections 8 extend connects to one of the opposite passages 10 sandwiching the corresponding projection 8 (first projection), and the other one of the adjacent grooves 13 connects to the other one of the opposite passages 10 sandwiching the corresponding projection 8 (first projection).

Figure 3:
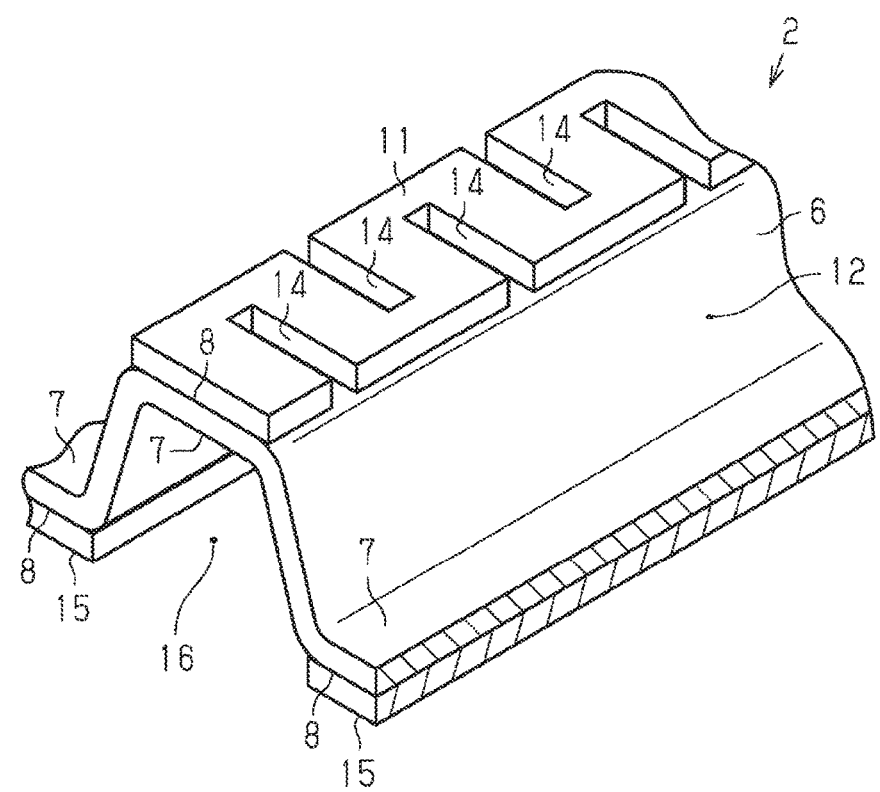
FIG. 3 is a perspective view showing the separator from a portion in contact with an anode electrode layer.

As shown in FIG. 3, the portion (upper surface in FIG. 3) of the thin film 11 that is in contact with the anode electrode layer 4 of the membrane electrode assembly 1 includes grooves 14. The grooves 14 extend in the direction intersecting the recesses 7 and the projections 8 to connect to the passage 12. The grooves 14 are spaced apart from one another in the direction in which the projections 8 extend. One end of each groove 14 in the longitudinal direction connects to the passage 12. More specifically, the grooves 14 that are adjacent to each other in the direction in which the projections 8 extend connects to different ones of the passages 12 located on the opposite sides of the corresponding projection 8 (first projection). That is, one of the adjacent grooves 14 in the direction in which the projections 8 extend connects to one of the opposite passages 12 sandwiching the corresponding projection 8 (first projection), and the other one of the adjacent grooves 14 connects to the other one of the opposite passages 12 sandwiching the corresponding projection 8 (first projection).

The operation of the separator 2 in the present embodiment will now be described.

When the generation of power in the fuel cell generates water in the cathode electrode layer 5 of the membrane electrode assembly 1, the water is kept between the cathode electrode layer 5 and the thin films 9. As a result, the water generated in the cathode electrode layer 5 is not fully discharged out of the fuel cell by the flow of air in the passage 10. Thus, the water may collect in the vicinity of the cathode electrode layer 5. The collection of water in the vicinity of the cathode electrode layer 5 limits contact of air with the cathode electrode layer 5. As a result, oxidizing gas is not fully diffused in the membrane electrode assembly 1, thereby deteriorating the reaction of fuel gas with oxidizing gas.

However, in the separator 2 of the present embodiment, the grooves 13 in the thin film 9 restrict situations in which the water generated in the cathode electrode layer 5 of the membrane electrode assembly 1 due to power generation in the fuel cell is kept between the cathode electrode layer 5 and the thin film 9. That is, the water between the cathode electrode layer 5 and the thin film 9 is discharged out of the passage 10, through which air flows, via the grooves 13 in the thin film 9. Further, the flow of air in the passage 10 causes the water to be discharged out of the fuel cell.

When a certain amount of moisture is contained in the thin films 9 and 11, the thin films 9 and 11 easily reduce an increase in the electrical resistance. Thus, when the membrane electrode assembly 1 is thinned, the water generated in the cathode electrode layer 5 may be able to travel through the electrolyte film 3 and move toward the anode electrode layer 4. In this case, when water is contained in the thin films 11 that are in contact with the anode electrode layer 4 of the membrane electrode assembly 1 in the separator 2, an increase in electrical resistance in the thin films 11 is easily reduced. If the water is kept more than necessary between the thin films 11 and the anode electrode layer 4 so that the water excessively collects in the vicinity of the anode electrode layer 4, contact of fuel gas (hydrogen) on the anode electrode layer 4 is limited. This may deteriorate the reaction of fuel gas with oxidizing gas in the membrane electrode assembly 1.

However, in the separator 2 of the present embodiment, the grooves 14 are formed in the thin films 11 that are in contact with the anode electrode layer 4. Thus, the grooves 14 of the thin films 11 restrict the water from being kept more than necessary between the anode electrode layer 4 and the thin films 11. That is, the excessive water between the anode electrode layer 4 and the thin film 11 is discharged out of the passage 12, through which fuel gas (hydrogen) flows, via the grooves 14 in the thin film 11. Further, the flow of fuel gas in the passage 12 discharges the water out of the fuel cell.

The present embodiment has the following advantages.

(1) In the cathode electrode layer 5 of the membrane electrode assembly 1, the generation of power generates water. This water is restricted from collecting between the cathode electrode layer 5 and the thin films 9, which are arranged on the surfaces of the projections 8 (first projections) of the separator body 6.

(2) One end of each groove 13 in the longitudinal direction connects to the passage 10. This causes the water between the thin film 9 and the cathode electrode layer 5 of the membrane electrode assembly 1 to be easily discharged out of the passage 10 via the grooves 13. One of the opposite ends of each groove 13 in the longitudinal direction connects to the passage 10 and the other one of the opposite ends does not connect to the passage 10. As a result, the pressure easily increases in the groove 13, thereby expediting the discharge of water between the thin film 9 and the cathode electrode layer 5.

(3) When the hydrophilicity of the thin film 9 is low, water in the groove 13 is easily repelled on the inner surface of the groove 13. This limits movement of the water in the groove 13 and thus limits movement of the water in the direction in which the water is discharged to the passage 10. However, the thin film 9 has a higher hydrophilicity than the separator body 6. Thus, water in the grooves 13 in the thin film 9 easily diffuses on the inner surfaces of the grooves 13. This facilitates movement of the water in the direction in which the water is discharged from the grooves 13 to the passage 10.

(4) Even when water generated in the cathode electrode layer 5 of the membrane electrode assembly 1 is moved toward the anode electrode layer 4, the grooves 14 of the thin films 11 restrict the water from being kept more than necessary between the anode electrode layer 4 and the thin films 11, which are arranged on the surfaces of the projections 8 (first projections) of the separator body 6. This restricts the excessive water from collecting between the anode electrode layer 4 of the membrane electrode assembly 1 and the thin films 11, which are arranged on the surfaces of the projections 8 (first projections) of the separator body 6.

(5) One end of each groove 14 in the longitudinal direction connects to the passage 12. This causes the water between the thin film 11 and the anode electrode layer 4 of the membrane electrode assembly 1 to be easily discharged out of the passage 12 via the grooves 14 for the same reason as the above-described advantage (2).

(6) The thin film 11 has a higher hydrophilicity than the separator body 6. Thus, for the same reason as the above-described advantage (3), water in the grooves 14 easily moves in the direction in which the water is discharged to the passage 12.

The above-described embodiment may be modified as described below.

The separator body 6 is made of titanium or stainless steel. Instead, the separator body 6 may be made of other types of conductive materials such as carbon.

The grooves 13 adjacent to each other in the direction in which the projections 8 extend may connect to the same one of the opposite passages 10 sandwiching the corresponding projection 8 (first projection). In the same manner, the grooves 14 adjacent to each other in the direction in which the projections 8 extend may connect to the same one of the opposite passages 12 sandwiching the corresponding projection 8 (first projection).

Figure 4:
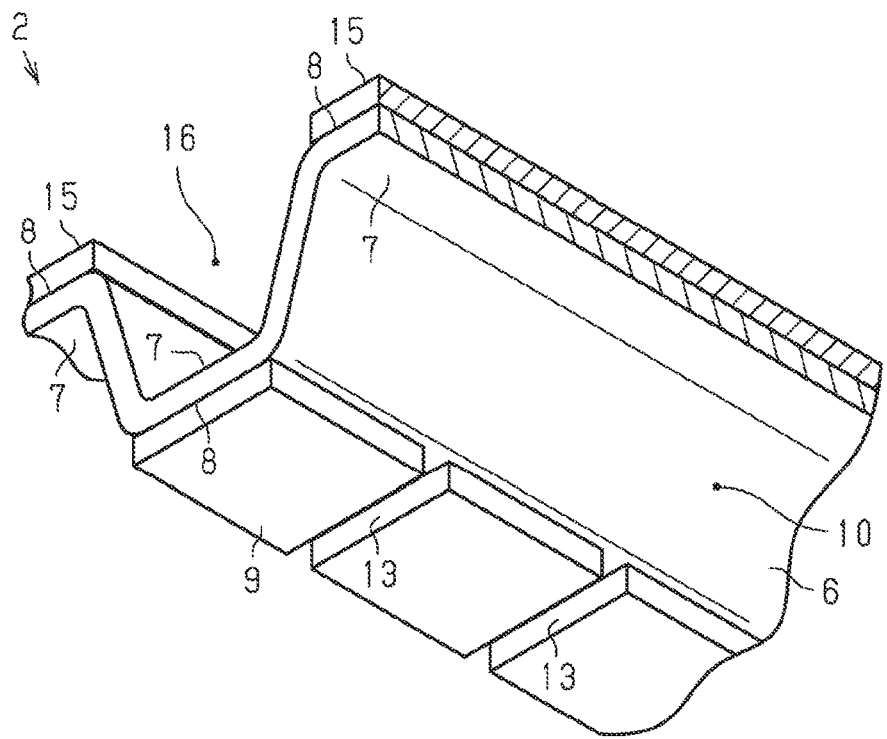
FIG. 4 is a perspective view showing another example of the grooves.
Figure 5:
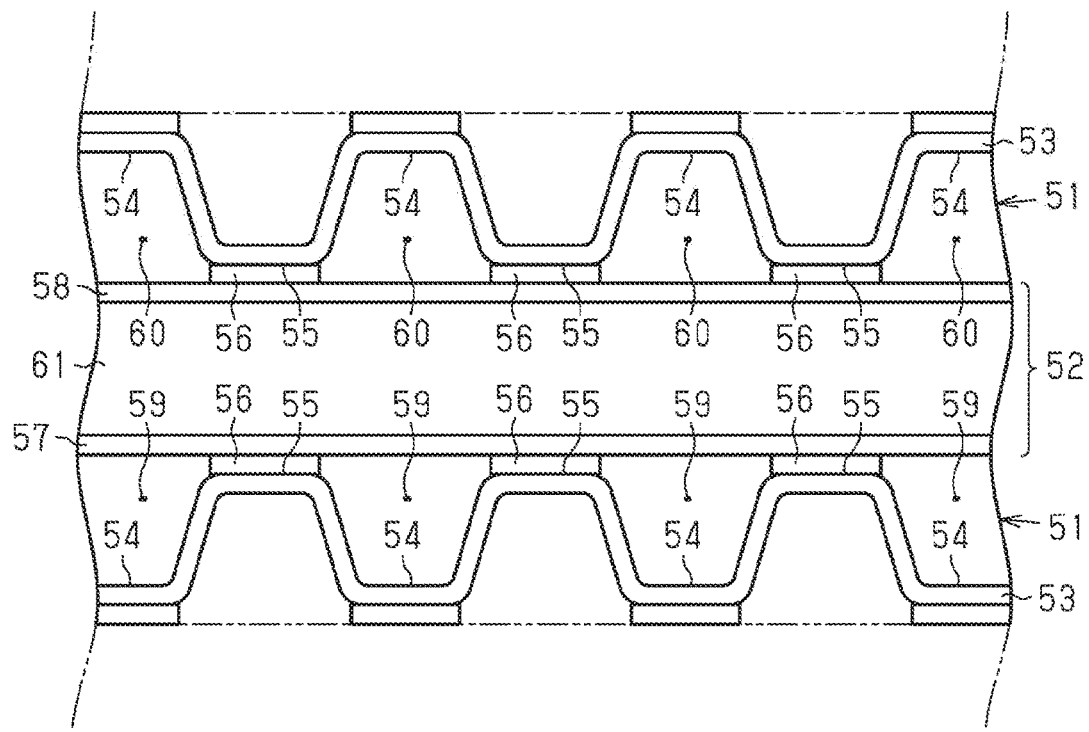
FIG. 5 is a cross-sectional view showing a typical fuel cell separator.

As shown in FIG. 4, each groove 13 may be configured such that one of the opposite ends of the groove 13 in the longitudinal direction connects to one of the opposite passages 10 sandwiching the corresponding projection 8 (first projection) and the other one of the opposite ends of the groove 13 in the longitudinal direction connects to the other one of the opposite passages 10 sandwiching the corresponding projection 8 (first projection). In the same manner, each groove 14 may be configured such that one of the opposite ends of the groove 14 in the longitudinal direction connects to one of the opposite passages 12 sandwiching the corresponding projection 8 (first projections) and the other one of the opposite ends of the groove 14 in the longitudinal direction connects to the other one of the opposite passages 12 sandwiching the corresponding projection 8 (first projection).

The thin films 9 and 11, which respectively include the grooves 13 and 14 are formed through inkjet printing. Thus, pattern adjustment of inkjet printing may be used to change the shapes of the grooves 13 and 14 of the thin films 9 and 11.

The grooves 13 of the thin film 9 or the grooves 14 of the thin film 11 may be omitted.

The thin films 9 and 11 do not necessarily have to have a higher hydrophilicity than the separator body 6.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell separator comprising:
   a plate-shaped conductive separator body configured to be arranged between membrane electrode assemblies in a fuel cell; and
   recesses and projections formed in the separator body such that the recesses and the projections are alternately arranged in parallel to each other, wherein
   the projections include first projections that are configured to face an electrode layer of the membrane electrode assembly,
   a thin film is arranged on a surface of each of the first projections, the thin film having a higher conductivity than the separator body,
   the first projections are configured to be in contact with the electrode layer of the membrane electrode assembly with the thin films located in between,
   the recesses include first recesses that open in a protruding direction of the first projections,
   each of the first recesses is configured to form a passage through which oxidizing gas or fuel gas is supplied to the electrode layer of the membrane electrode assembly, the passage being located on an inner side of each of the first recesses, and
   a portion of each of the thin films that is in contact with the electrode layer of the membrane electrode assembly includes a groove, the groove extending in a direction intersecting the recesses and the projections and connecting to at least one of the passages located on opposite sides of one of the first projections that includes the thin film.

2. The fuel cell separator according to claim 1, wherein the groove has an end in a longitudinal direction of the groove, the end connecting to the passage.

3. The fuel cell separator according to claim 2, wherein
   the groove is one of a plurality of grooves spaced apart from one another in a direction in which the projections extend, and
   ones of the grooves that are adjacent to each other in the direction in which the projections extend connect to different ones of the passages located on the opposite sides of the corresponding first projection.

4. The fuel cell separator according to claim 1, wherein the groove has opposite ends in a longitudinal direction of the groove, one of the opposite ends connecting to one of the passages located on the opposite sides of the corresponding first projection, the other one of the opposite ends connecting to the other one of the passages located on the opposite sides of the corresponding first projection.

5. The fuel cell separator according to claim 1, wherein the thin film has a higher hydrophilicity than the separator body.

* * * * *